(12) United States Patent
Rinderknecht

(10) Patent No.: US 6,435,806 B1
(45) Date of Patent: Aug. 20, 2002

(54) PICK-UP VEHICLE HAVING A SWIVEL DEVICE, SWIVEL DEVICE, AND PROCESS FOR LOADING AND UNLOADING THE PICK-UP VEHICLE

(75) Inventor: Frank Markus Rinderknecht, Küsnacht (CH)

(73) Assignee: Grover Trading Corporation AG, Zug (CH)

( * ) Notice: Subject to any disclaimer, the term of this patent is extended or adjusted under 35 U.S.C. 154(b) by 0 days.

(21) Appl. No.: 09/464,445

(22) Filed: Dec. 16, 1999

(30) Foreign Application Priority Data

Dec. 17, 1998 (CH) ............................................ 2498/98
Aug. 31, 1999 (CH) ............................................ 1589/99

(51) Int. Cl.[7] ................................................ B60P 1/48
(52) U.S. Cl. ........................ 414/546; 212/255; 414/917
(58) Field of Search ................................ 414/546, 917; 212/255, 258, 260, 261

(56) References Cited

U.S. PATENT DOCUMENTS

| | | | |
|---|---|---|---|
| 2,639,825 A | | 5/1953 | Eakin |
| 2,689,053 A | * | 9/1954 | Olson .......................... 414/546 |
| 3,276,610 A | * | 10/1966 | Thatcher ..................... 212/289 |
| 3,664,516 A | | 5/1972 | Goudy ....................... 212/46 A |
| 4,058,229 A | * | 11/1977 | Triplett ........................ 212/256 |
| 4,348,151 A | | 9/1982 | Olson .......................... 414/542 |
| 4,383,791 A | | 5/1983 | King ............................ 414/542 |
| 4,509,894 A | * | 4/1985 | Rolfe .......................... 414/917 |
| 4,579,503 A | * | 4/1986 | Disque ........................ 414/917 |
| 4,671,729 A | * | 6/1987 | McFarland ................. 414/917 |
| 4,979,865 A | | 12/1990 | Strickland ................... 414/486 |

FOREIGN PATENT DOCUMENTS

| | | | |
|---|---|---|---|
| CH | 507824 | 7/1971 | |
| CH | 546657 | 3/1974 | |
| DE | 1843921 | 2/1960 | |
| DE | 7200659 | 4/1972 | |
| EP | 080524 | 6/1983 | |
| EP | 191683 | 8/1986 | |
| EP | 330574 | 8/1989 | |
| EP | 337678 | 10/1989 | |
| EP | 849115 | 6/1998 | |
| GB | 1023366 | 3/1966 | |
| GB | 2073709 | 10/1981 | |
| JP | 54-9823 | * 1/1979 | ................. 414/546 |
| SU | 713722 | * 2/1980 | ................. 414/546 |
| WO | 98/23463 | 6/1998 | |

OTHER PUBLICATIONS

MEGA–HOIST—Lift System for Trucks, Cody Industries, Inc..

* cited by examiner

Primary Examiner—James W. Keenan
(74) Attorney, Agent, or Firm—Greenblum & Bernstein, P.L.C.

(57) ABSTRACT

Pick-up vehicle having an open cargo bed coupled to a passenger cab, side walls, a rear wall, and wheel wells located one of inside and outside of the cargo bed. The pick-up vehicle includes a swivel device adapted for loading and unloading the open cargo bed. The swivel device includes at least one swivel arm, at least one connecting bridge, and at least one movable connection piece. A swivel axis of the swivel device is located between the rear wall and the wheel wells. The at least one swivel arm includes swivel arms located on both sides of the cargo bed, and the at least one connecting bridge is positioned to couple the swivel arms to form a swivel yoke. The swivel device also includes two swivel axes located one behind the other in a longitudinal direction of the vehicle. A swivel arm is swivelably coupled around one of the two swivel axes, and the swivel arms are coupled together through the at least one movable connection piece, thereby forming a parallelogram-like swivel arm structure.

16 Claims, 6 Drawing Sheets

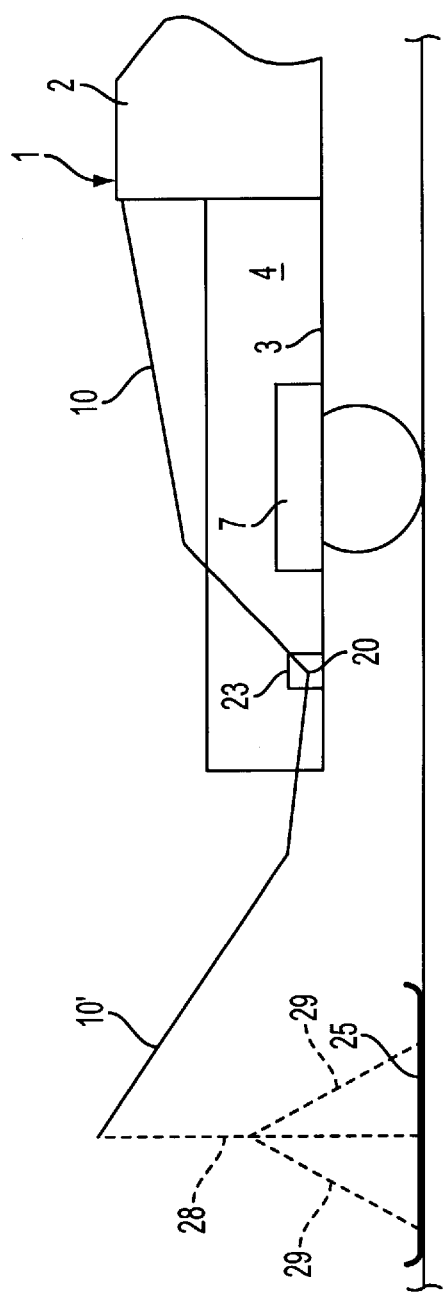
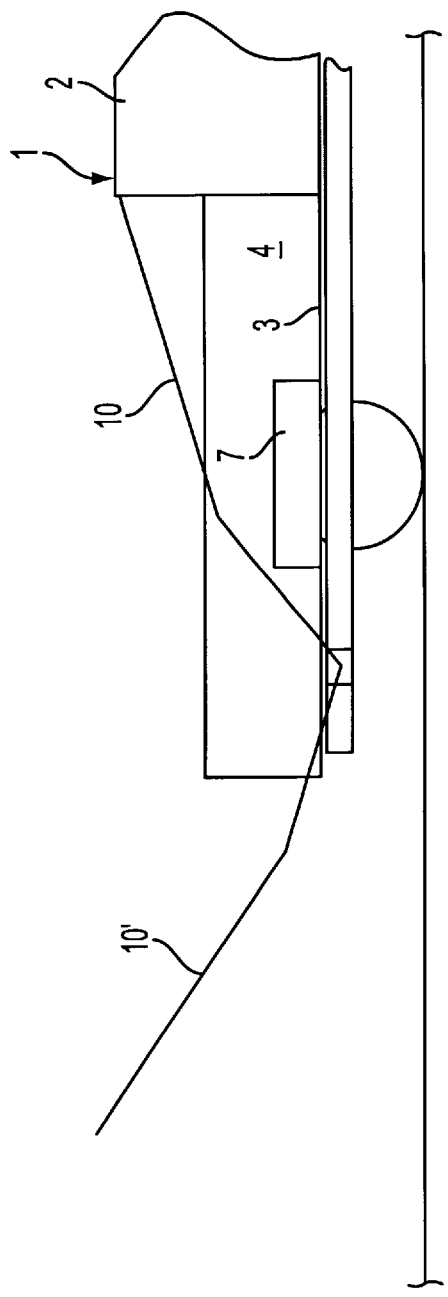

PICK-UP VEHICLE HAVING A SWIVEL DEVICE, SWIVEL DEVICE, AND PROCESS FOR LOADING AND UNLOADING THE PICK-UP VEHICLE

CROSS-REFERENCE TO RELATED APPLICATIONS

The present application claims priority under 35 U.S.C. §119 of Swiss Patent Application No. 2498/98 dated Dec. 17, 1998 and Swiss Patent Application No. 1589/99 dated Aug. 31, 1999, the disclosures of which are expressly incorporated by reference herein in their entireties.

BACKGROUND OF THE INVENTION

1. Field of the Invention

The present invention relates to a pick-up vehicle having an open cargo bed connected to a passenger cab in which the cargo bed includes or is defined by side walls, a rear wall, and wheel wells located inside or outside of the cargo bed. The invention also relates to a swivel device for loading and unloading the pick-up vehicle, and to a process for loading and unloading the pick-up vehicle.

2. Discussion of Background Information

Pick-up vehicles, e.g., road vehicles having a passenger cab connected to a cargo bed separated from the vehicle chassis, include side walls and a rear wall. The loading of pick-up vehicles can present problems when loads which cannot be lifted, either over the side walls or into the cargo bed through an opened rear wall, by hand. Since pick-up vehicles are being used more frequently as recreational vehicles, also called SUVs (sport utility vehicles), it would be beneficial to be able to load them with, e.g., all-terrain motorcycles or small watercraft without problems. When loading motorcycles, e.g., ramps can be used, however, this may require considerable dexterity and pose a certain safety hazard when the motorcycle is driven onto the ramp. Of course, when loading watercraft, the ramp option is not available. Moreover, the loading of other loads by hand can also be problematic.

Swivel devices for onloading, offloading, and tilting of trough-shaped containers are known, e.g., for use with trucks and construction vehicles. For trucks, two lateral swivel arms are generally provided which are respectively swivelably linked with one end behind the truck chassis. Further, the swivel arms can have a holding device for a load-bearing device, e.g., chains or wire cable at their free end, which device can be attached to the hopper to be onloaded or offloaded. During onloading, the hopper is deposited or positioned on transverse or longitudinal supports of the truck chassis. The swiveling motion of the swivel arms is generally achieved by hydraulically activated piston/cylinder arrangements which are fastened to the chassis and to the respective swivel arm. Swiss Patent Application No. CH-A-546 657 discloses, e.g., a swivel device for a truck, and European Patent Application No. EP-A-0 337 678 discloses, e.g., a construction vehicle having a swivel device for hoppers, in which the hoppers are likewise laterally received on swivel arms. A bridge that connects the swivel arms to an additional holding element serves to hold the hopper in a fixed position, which is arranged on the swivel arms when this hopper is tilted.

With such known swivel/tilt devices, a large height in the rest state results which is not objectionable for trucks and specialty vehicles, i.e., construction vehicles, but which by contrast is unacceptable for road vehicles such as pick-up vehicles because these vehicles should also be able to negotiate residential and commercial garages as well as wash stations.

SUMMARY OF THE INVENTION

The present invention provides a simple option for loading even bulky and/or heavy loads onto a pick-up vehicle without diminishing the vehicle's suitability as a normal road vehicle.

Thus, the present invention is directed to a pick-up vehicle similar in general to that discussed above, which also includes a swivel device for loading and unloading of the vehicle. The swivel device includes at least one swivel arm which is laterally arranged in the cargo bed, and a swivel axis of the swivel device is arranged between the end of the cargo bed, i.e., the rear wall, and the wheel wells. The swivel arm also includes at least one bent or curved section along its length.

Using the swivel device of the instant invention for loading and unloading a pick-up vehicle allows for effortless loading and unloading by depositing a load on the ground behind the vehicle or on the cargo bed, and for a reduction in the height at the rest position through the curvature of or bend in the swivel arms, which renders the pick-up vehicle more roadworthy.

Further, the present invention provides a swivel device for the pick-up vehicle which ensures good loadability of the vehicle without impairing the use of the vehicle as a road vehicle. In this regard, the swivel device includes at least one swivel arm which is laterally arranged in the cargo bed, and a swivel axis of the swivel device is arranged between the end of the cargo bed, i.e., the rear wall, and the wheel wells. The swivel arm also includes at least one bent or curved section along its length.

The bowed or bent swivel arms of the swivel arms enables the swivel device to be arranged on a pick-up vehicle without significantly increasing height of such a vehicle. Moreover, the swivel device allows for simple loading and unloading of the pick-up vehicle.

Further still, the present invention is directed to a process in which a pick-up vehicle can be simply loaded and unloaded without limiting the suitability of the vehicle as a road vehicle. In this regard, a loading and unloading motion of the process includes swiveling of the swivel arm.

The present invention is directed to a pick-up vehicle having an open cargo bed coupled to a passenger cab, side walls, a rear wall, and wheel wells located one of inside and outside of the cargo bed. The pick-up vehicle includes a swivel device adapted for loading and unloading the open cargo bed, and the swivel device includes at least one swivel arm having one of a curved and bent section along its length. A swivel axis of the swivel device is located between the rear wall and the wheel wells.

According to a feature of the instant invention, at least one connecting bridge can be included. The at least one swivel arm can include swivel arms located on both sides of the cargo bed, and the at least one connecting bridge can be positioned to couple the swivel arms to form a swivel yoke. The swivel yoke in a resting position can form a roll bar for the passenger cab.

In accordance with another feature of the present invention, at least one movable connection piece can be included. The swivel device can include two swivel axes located one behind the other in a longitudinal direction of the vehicle, a swivel arm can be swivelably coupled around the two swivel axes, and the swivel arms may be coupled together through the at least one movable connection piece, thereby forming a parallelogram-like swivel arm structure. At least one load uptake device can be couplable to the movable connection piece. At least one rigid suspension can be included. The at least one load uptake device may include a platform, and the at least one rigid suspension can rigidly couple the platform to the movable connection piece.

According to still another feature of the invention, the swivel axes can lie essentially on a plane of the cargo bed. Alternatively, the swivel axes can lie beneath a plane of the cargo bed. Moreover, at least one of the swivel axes may be raised compared to the cargo bed.

The present invention is also directed to a swivel device for loading and unloading a pick-up vehicle. The pick-up vehicle can have an open cargo bed coupled to a passenger cab, side walls, a rear wall, and wheel wells located one of inside and outside of the cargo bed. The swivel device includes at least one swivel arm having one of a curved and bent section along its length. A swivel axis of the swivel device is adapted to be located between the rear wall and the wheel wells.

In accordance with a feature of the instant invention, at least one connecting bridge can be included. The at least one swivel arm can include swivel arms located on both sides of the cargo bed, and the at least one connecting bridge can be positioned to couple the swivel arms to form a swivel yoke.

Still further, in accordance with a feature of the instant invention, the swivel device can further include an hydraulic, electric, pneumatic, or hand-activated drive for swiveling of the swivel yoke.

The swivel device, in accordance with still another feature of the invention, can further include at least one movable connection piece. The swivel device may include two swivel axes located one behind the other in a longitudinal direction of the vehicle, a swivel arm may be swivelably coupled around the two swivel axes, and the swivel arms may be coupled together through the at least one movable connection piece. In this manner, a parallelogram-like swivel arm structure can be formed.

According to a further feature of the present invention, at least one load uptake device can be couplable to the movable connection piece. The invention can further include at least one rigid suspension. The at least one load uptake device can include a platform, and the at least one rigid suspension may rigidly couple the platform to the movable connection piece.

In accordance with a still further feature of the instant invention, a support bracket can be adapted to lie on the cargo bed and to provide the swivel axis.

Moreover, the swivel axis can be located about a portion of a chassis of the pick-up vehicle.

The present invention can also include the at least one swivel arm that includes a longitudinally adjustable lifting arm.

The instant invention is also directed to a process for loading and unloading of a pick-up vehicle with a swivel device. The pick-up vehicle can have an open cargo bed coupled to a passenger cab, side walls, a rear wall, and wheel wells located one of inside and outside of the cargo bed, and the swivel device can have at least one swivel arm having one of a curved and bent section along its length that is swivelable around a swivel axis located between the rear wall and the wheel wells. The process can include coupling the swivel arm to a load, and swiveling the swivel arm to one of load and unload the pick-up vehicle with the load.

In accordance with yet another feature of the invention, the swivel device can further includes a parallelogram-like swivel arm and a load platform, and the process may further include maintaining the load platform in a substantially horizontal orientation throughout the one of the loading and unloading.

The present invention is also directed to a pick-up vehicle having an open cargo bed coupled to a passenger cab, side walls, a rear wall, and wheel wells located one of inside and outside of the cargo bed. The pick-up vehicle includes a swivel device including at least two swivel arms swivelably coupled to a support device at first ends, and the at least two swivel arms include at least one of a bent and a curved section. A connecting bridge is positioned to couple the at least two swivel arms at ends opposite the first ends, to form a swivelable yoke. The swivel arms are swivelably positionable between a rest position in which the swivel arms are substantially over the cargo bed and an extended position in which the arms extend out of the cargo bed in a direction of the rear wall.

According to a feature of the invention, the support device can be positioned above a plane of said cargo bed, can positioned below a plane of said cargo bed, or can be positioned on a plane of the cargo bed.

The present invention is also directed to a pick-up vehicle having an open cargo bed coupled to a passenger cab, side walls, a rear wall, and wheel wells located one of inside and outside of the cargo bed. The pick-up vehicle includes a swivel device comprising at least four swivel arms swivelably coupled to support devices at first ends, and the at least four swivel arms are formed into at least two pairs and include at least one of bent and curved sections. At least two connecting bridges are positioned to couple the at least two pairs of swivel arms at ends opposite the first ends, to form at least two swivelable yokes. At least two connections are provided for coupling the two swivelable yokes together at the ends opposite the first ends. The at least two swivelable yokes are swivelably positionable between a rest position in which said swivel arms are substantially over the cargo bed and an extended position in which the swivel arms extend out of the cargo bed in a direction of the rear wall.

According to a feature of the invention, the support devices can be positioned above a plane of said cargo bed, can positioned below a plane of said cargo bed, can be positioned on a plane of the cargo bed, and/or can be positioned at least two different heights with respect to a plane of the cargo bed.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 2 illustrates a schematic side view of the pick-up vehicle depicted in FIG. 1;

FIG. 4 illustrates a schematic side view of the embodiment depicted in FIG. 3;

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
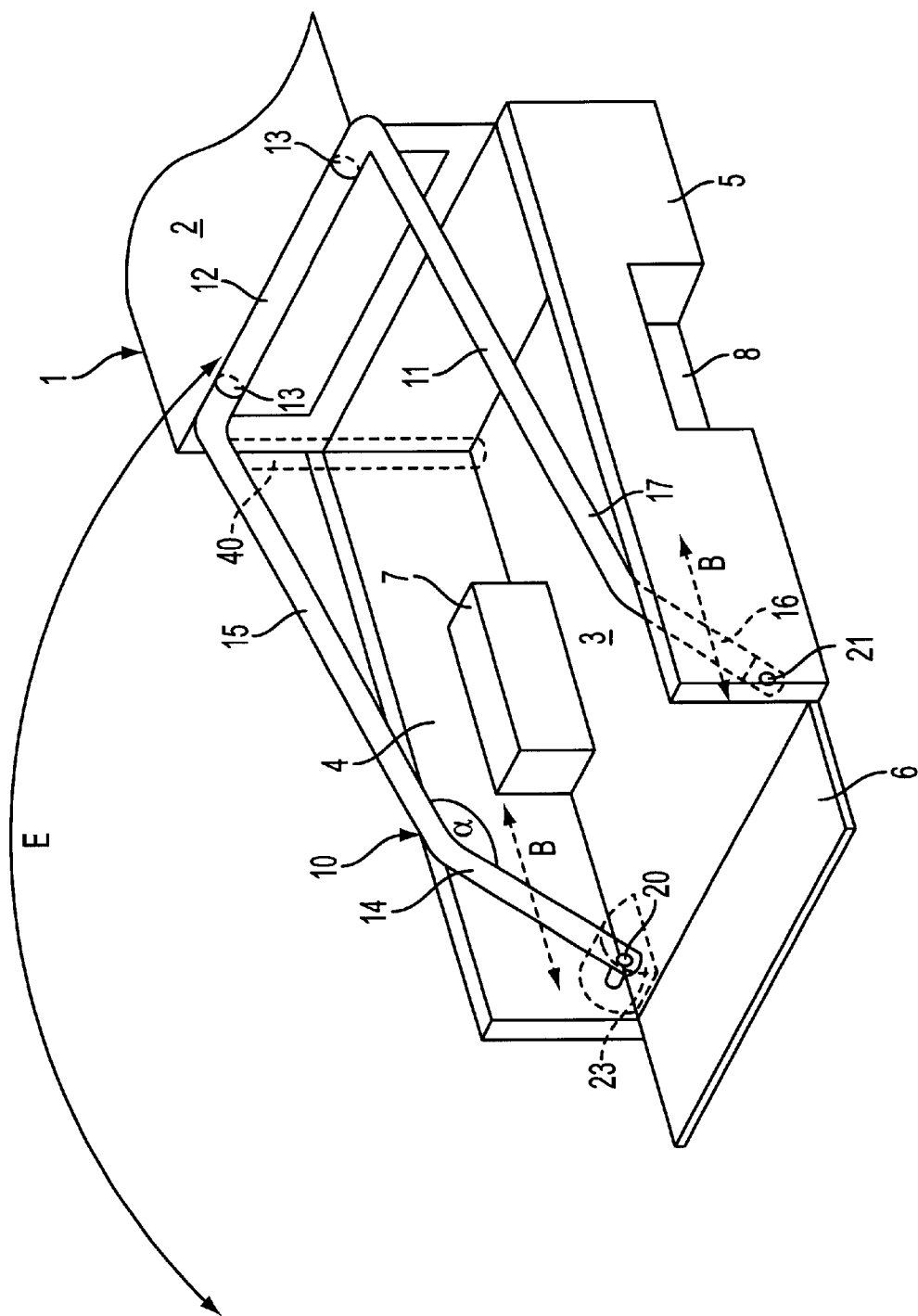
FIG. 1 illustrates a schematic, diagrammatic view of an exemplary embodiment of a swivel device coupled to a pick-up vehicle.

FIG. 1 illustrates a schematic partial view of a pick-up vehicle 1 in which a passenger cab 2 is only partially depicted. Pick-up vehicle 1 also includes a cargo bed 3 that includes or is defined by side walls 4 and 5 and rear wall 6. Rear wall 6 is depicted in an opened position, and can be lifted or swung upwardly so to close the cargo bed. Rear wall 6 can also be totally downwardly foldable. In the exemplary embodiment, wheel wells 7 and 8 can project into bed 3 of pick-up vehicle 1. However, wheel wells 7 and 8 can also be arranged as fenders outside the actual cargo bed, e.g., if the bed is correspondingly narrower, or the wheels are arranged with correspondingly wider fenders outside of vehicle 1. In FIG. 1, a swivel device having two swivel arms 10 and 11 is schematically depicted in a rest position. In the exemplary embodiment, a bridge 12, which extends cross-wise (laterally) to the a vehicle longitudinal axis, can be utilized to connect ends of swivel arms 10 and 11 to each other to form a U-shaped swivel yoke. In the depicted embodiment, the ends of swivel arms 10 and 11 opposite the swivel yoke can be coupled to axial elements 20 and 21 which form a rotational axis for the swivel yoke. Axial elements 20 and 21 can hereby be respectively accepted in a support bracket, of which only support bracket 23 is depicted in FIG. 1 in dashed lines. The construction of the swivel support is known to those ordinarily skilled in the art, and, therefore, need not be discussed further here. Support bracket 23 can be fixed on an upper side of the cargo bed or on a lower side of the cargo bed. Thus, if necessary, the cargo bed can be reinforced at these locations with plates or braces. Arrow E shows a swiveling motion between the rest position, in which bridge 12 of the support yoke lies near or adjacent cab 2, and a load uptake position, in which the support yoke is swung away from cab 2 into a ready position to accept a load.

FIG. 2 illustrates a sectional side view of pick-up vehicle 1 in which side wall 5 and swivel arm 11 are not depicted, so as to more clearly depict side wall 4, the motion of swivel arm, which is depicted in the rest position as swivel arm 10 and in the load position as swivel arm 10', and swivel axis 20. Otherwise, same reference characters are used identifying identical parts from FIG. 1.

A loading platform 25 can be preferably fastened to load contact points 13 (see FIG. 1) of swivel arms 10 and 11 via chains or wire cables 28 and 29. In the exemplary embodiment, load contact points 13 can be formed by bridge 12, which connects the ends of swivel arms 10 and 11. However, if bridge 12 is not provided, which results in swivel arms 10 and 11 not being connected to one another, the load can be accepted at these free ends of swivel arms 10 and 11. Platform 25 facilitates simple loading of the cargo bed with, e.g, a motorcycle, which can be driven onto the platform when the platform is placed on the ground behind pick-up vehicle 1, as schematically illustrates in FIG. 2. After the load is arranged on the platform, the load (and platform) can be loaded by swiveling the swivel device forward to the cab 2 into the bed 3 of the pick-up vehicle. For unloading, the process is performed by a swivel motion to the rear. Of course, instead of platform 25 another element can be provided which can accept a load, or the load can be attached directly to the swivel arms or the bridge, i.e., without a platform or auxiliary element, with, e.g., ropes or chains, and can be loaded into bed 3 by swiveling the swivel device.

Driving of the swivel device for loading or unloading swiveling movements can be effected in basically known manner, e.g., with a hydraulic piston/cylinder arrangement coupled between bed 3 (or the vehicle chassis) and the respective swivel arm. Such an arrangement is roughly schematically indicated by arrow B in FIG. 1. The arrangement of such a drive is known to those ordinarily skilled in the art, and, therefore, need not be discussed further here. Further, instead of such the known hydraulic piston/cylinder arrangement drive, a pneumatically driven piston/cylinder arrangement could also be provided. In both cases, the hydraulic or pneumatic pressure can be created by a pump which is either connected to a motor drive of the vehicle or to its own motor, which is independent of the vehicle motor, e.g., an electric motor coupled to the vehicle battery. Moreover, instead of a piston/cylinder arrangement drive, an electric motor drive could be provided which, e.g., via a toothed gear arranged on axial element 20 and an electric motor provided with a worm gear, drives swivel arms 10 and 11 directly from the region of the swivel axis. Control and operation of the swivel motion or of the corresponding drive can be performed by a control and operation unit which can be arranged, e.g., in the passenger cab or in the bed of the vehicle. Such a control and operation unit can have, e.g., an infrared or radio control so that the swivel device can be operated at some distance from the vehicle.

In the example shown, swivel arms 10 and 11 are bent, with a first section 14 or 16 of respective swivel arm 10 or 11 extending from rotational axis 20 or 21. However, after first section 14 or 16, swivel arms 10 and 11 are bent to form respective bent sections 15 or 17. As shown in the exemplary illustration, the bending of swivel arms 10 and 11 decreases the height of swivel arms 10 and 11, i.e., when they are arranged in the rest position, from where they would extend if straight. The elevation of the end of swivel arms 10 and 11, or bridge 12, if provided, can be varied by the location of the bend and by the choice of angle cc. It is preferable for the elevation of the swivel arm ends, or the swivel yoke to lie approximately at the height of the upper edge of the passenger cab. Of course, a slightly higher rest position or a deeper rest position can also be chosen. In the exemplary embodiment, swivel arms 10 and 11 can be connected in their rest position to a swivel yoke that projects over the cab roof, so that the swivel device forms a roll bar for the passenger cab. In this manner, a support 40 may be preferably provided which is coupled, e.g., to the vehicle chassis to provide a fixed support for the swivel yoke in the rest position.

It is also contemplated that the swivel yoke or swivel arms 10 and 11 can also be longitudinally adjustable to provide at least a partial telescopic motion of the swivel arm bent sections 15 and 17. Such an arrangement may be especially practical when the swivel device is provided as a retrofit element for an existing pick-up vehicle and, through this adjustability of the swivel arm length, the swivel device can be adaptable to a variety of vehicle types or lengths of cargo beds. Furthermore, an activation mechanism can be provided for rear wall 6 so that rear wall 6 can automatically opens when the swivel device is swung out, or so that the rear wall closes when this swivel device is swung in.

Figure 3:
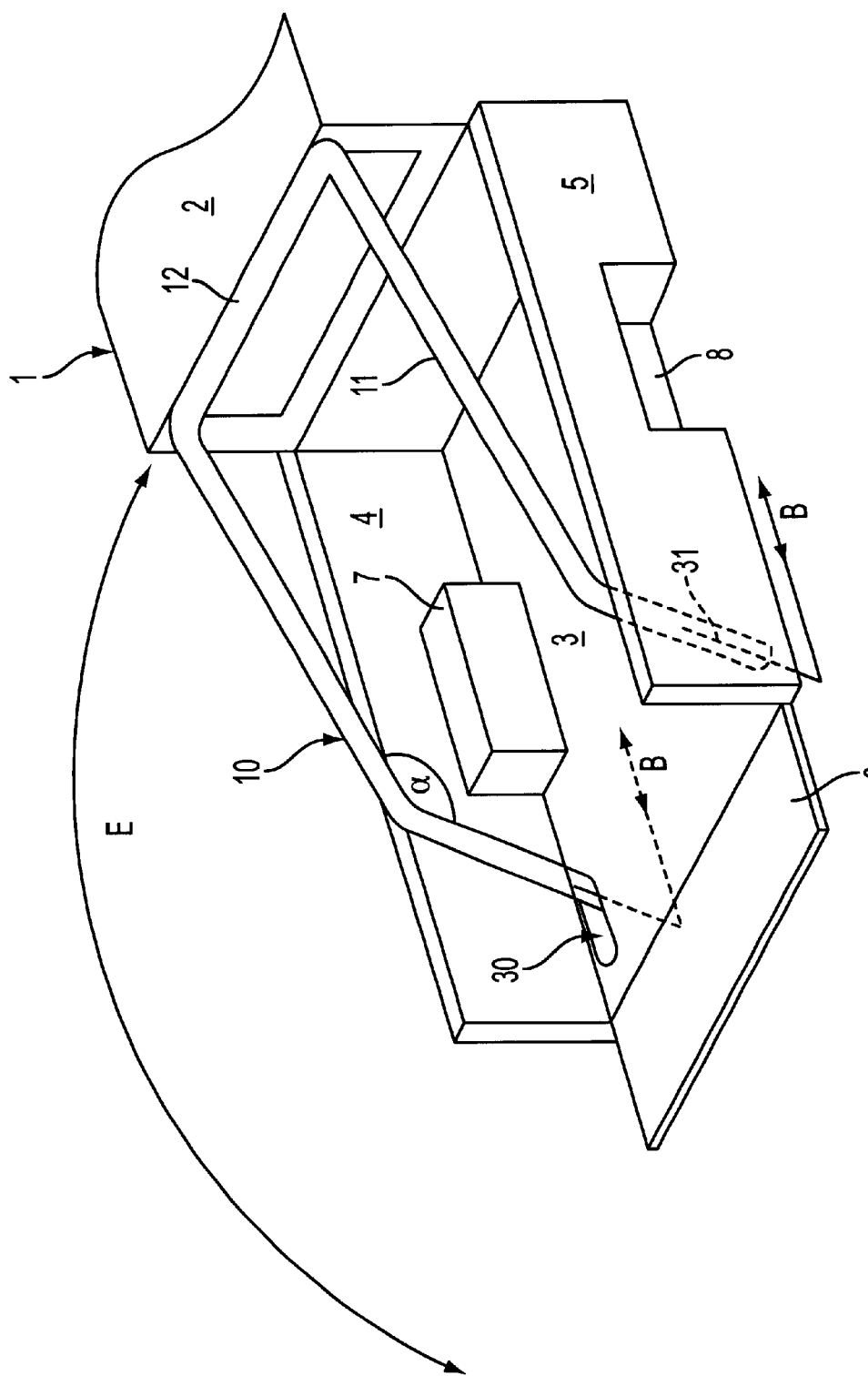
FIG. 3 illustrates a schematic, diagrammatic view of another embodiment of the swivel device coupled to a partially depicted pick-up vehicle.

FIGS. 3 and 4 illustrate another embodiment of the instant invention in which identical parts are identified with the same reference numerals. The swivel device depicted in FIGS. 3 and 4 is basically similar to that depicted in FIGS. 1 and 2, except that, where FIG. 1 illustrates an embodiment that is well suited for retrofitting a pick-up vehicle not equipped with a swivel device at the factory, FIGS. 3 and 4 (and to some extent FIG. 2) illustrate an embodiment which could be preferably used for retrofitting a pick-up vehicle with a swivel device at the factory. As depicted in FIGS. 3 and 4, the swivel axis for swivel arms 10 and 11 (or for the swivel yoke) can be arranged beneath a surface of cargo bed 3, so that cargo bed 3 can include recesses through which swivel arms 10 and 11 of the swivel yoke can project. In this case, the rotational axis or axial elements 30 and 31, or possibly a continuous axis or shaft, can be arranged on vehicle chassis 1 represented only by the support. Since pick-up vehicles are generally equipped with a separate chassis, e.g., a ladder frame chassis, not with a self-supporting body, the chassis can provide a stable linkage point for the swivel device, and which, as a rule, can allow loads heavier than those utilized with the swivel device arrangement on bed 3, as shown in FIG. 1. In this embodiment, the drive for swivel arms 10 and 11 preferably lies beneath cargo bed 3, and, e.g., can downwardly contact an extension of swivel arms 10 and 11, i.e., beneath the rotational axis. Such an arrangement is schematically depicted in FIG. 3 with arrows B. Other aspects discussed above with regard to FIGS. 1 and 2 apply to the alternative exemplary embodiment of FIGS. 3 and 4.

Moreover, FIG. 4 illustrates a side view of pick-up vehicle 1 without side wall 5 and swivel arm 11, i.e., which depicts side wall 4 and swivel arm 10. Swivel arm 10 and 10' are depicted in this figure, such that swivel arm 10 is depicted the rest position, and swivel arm 10' in depicted in the swung-out position.

Figure 5A:
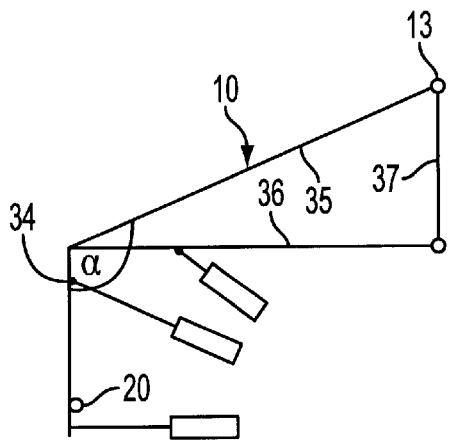
FIGS. 5A–5E illustrates schematic side views of swivel arms.

FIGS. 5A–5E, which illustrate alternative exemplary embodiments of swivel arms 10 from a side view, utilize same reference numerals to identify identical elements from the previous Figures. FIG. 5A illustrates a swivel arm 10 where first a section 34 extends essentially vertically upwardly from swivel axis 20, and a contrastingly bent swivel arm portion 35 is arranged to extend to load uptake point 13. Sections 36 and 37 are arranged to form braces, i.e., in the shape of a triangle. In a rough schematic depiction, three piston/cylinder arrangements are shown, e.g., to indicate where generally known drives could be positioned for coupling to the swivel arms. Both of the uppermost depicted drive arrangements can effect a backward swiveling by pushing the swivel arm, and the bottommost depicted drive arrangement, which lies below rotational axis 20, effects an outward swivel by pulling downwardly on the extension of section 34, which is cut off in the illustration.

Figure 5B:
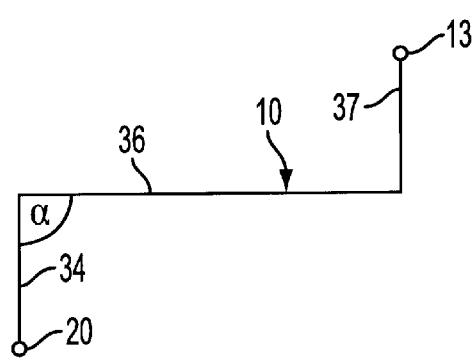
Figure 5C:
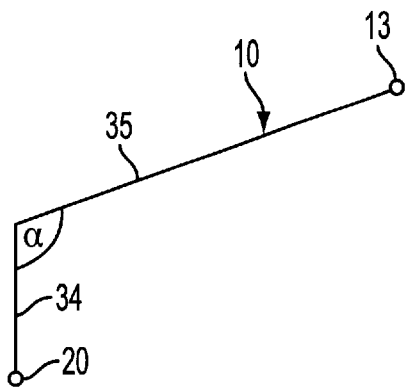
Figure 5D:
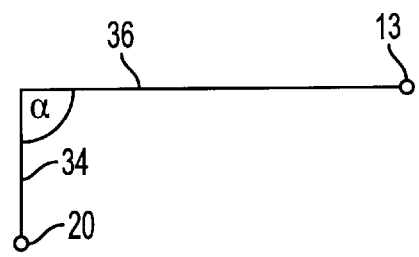
Figure 5E:
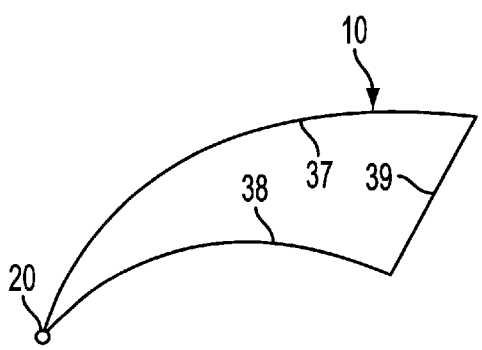

FIG. 5B illustrates another embodiment in which sections 36 and 37 of the swivel arm are coupled to upwardly leading section 34. FIG. 5C, in contrast, illustrates an embodiment in which section 35 is coupled to section 34. FIG. 5D illustrates an embodiment of swivel arm 10 having sections 34 and 36. FIG. 5E illustrates an embodiment in which swivel arm 10 which, instead of being a bent swivel arm, is formed as a curved swivel arm. In this embodiment, the height of swivel arm 10, in contrast to other swivel arm arrangements, can be decreased so that an overall lower height is obtained when used with a pick-up vehicle. Three swivel arm sections 37, 38, and 39 are depicted in the exemplary illustration. In a manner analogous to the other examples 5A–5D, it is possible, e.g., to only provide swivel arm section 37, to only provide swivel arm sections 38 and 39.

Figure 6:
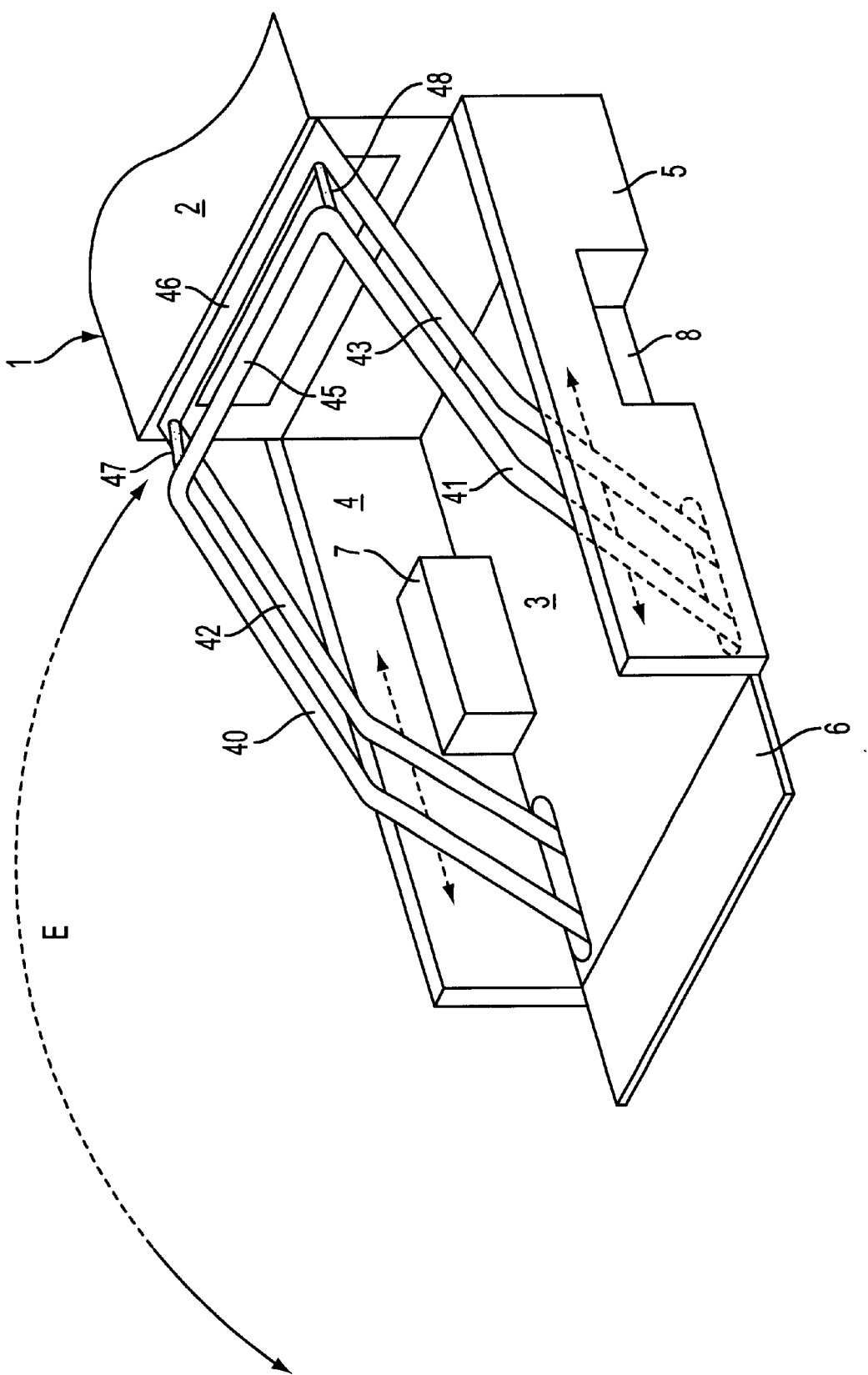
FIG. 6 illustrates a schematic, diagrammatic view of another embodiment in which the swivel arms are connected to two parallelograms.

FIG. 6 illustrates another embodiment of the present invention, which is similar to the embodiment depicted in FIG. 3, in which the swivel axis is located beneath cargo bed 3. However, in this alternative embodiment, two bent swivel arms are provided on each side of cargo bed 3. Accordingly, the same reference numerals are used to identify identical elements. In FIG. 6, bed 3 is provided with swivel arms 40 and 42 on one side, and swivel arms 41 and 43 on the other side. In this embodiment, swivel arms 40 and 41 can be preferably coupled to one another via a bridge 45 to a first swivel yoke, and swivel arms 42 and 43 can be preferably coupled to each other via bridge 46 to form a second swivel yoke. Moreover, additional connections 47 and 48 can be provided between bridges 45 and 46 (or between the first and second swivel yokes), to form a parallelogram-like structure on each side of the bed 3. Connections 47 and 48, as shown in FIG. 6, can be rotatably coupled to the first and second yokes (or arms 40 and 42 and arms 41 and 43) to enable swiveling motion swivel arms 40–43. The configuration of rotatable couplings for connections 47 and 48 to the bridges or arms can be made in quite different manners which are evident to those ordinarily skilled in the art, and, therefore, will not be discussed further here. The first and second swivel yokes, which formed from connecting swivel arms 40 and 41 through bridge 45, and from connecting swiveling arms 42 and 43 through bridge 46, are each swivelably arranged about individual axes which can be located above, at, below, or a combination thereof to the plane of cargo bed 3. A swivel drive can also be provided for only one swivel arm on each side of cargo bed 3, or a swivel drive can be provided for each swivel arm on each side of cargo bed 3. The load (not shown in FIG. 6), e.g., platform 25 depicted in FIG. 2, can be attached to the double yoke structure with, e.g., two, four, or even more rigid suspensions (such as rigid rods coupled at connections 47 and 48 and the load), or movable suspensions (such as chains fastened to bridges 45 and 46 or to connections 47 and 48 and the load). Thus, the attachment locations of these suspensions to the swivel yokes can be positionally fixed or positionally adjustable at the yoke. Through the provision of a plurality of suspensions, a stable attachment of the load is achieved, which to a large extent prevents swinging of the load.

Figure 7:
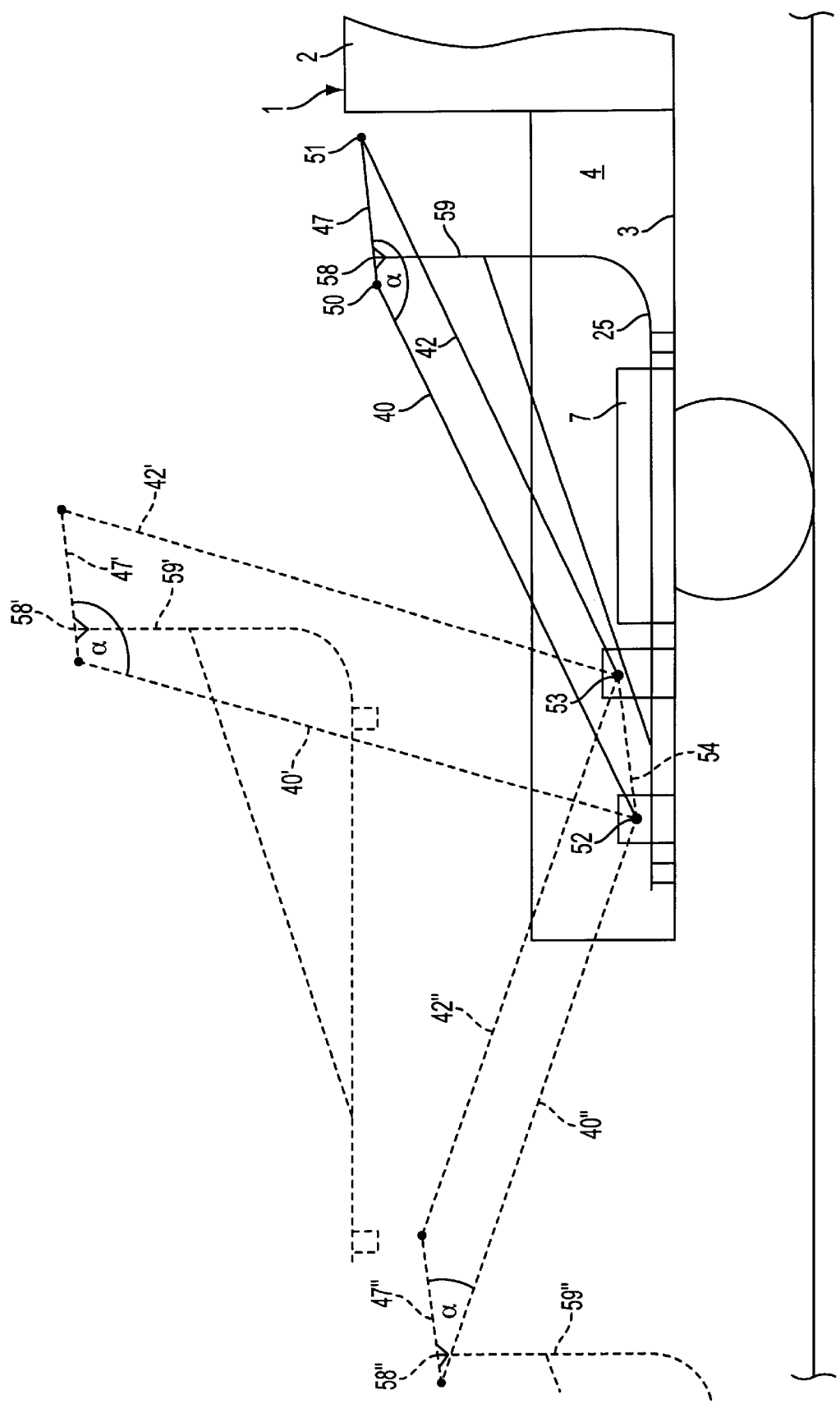
FIG. 7 illustrates a schematic side view of the embodiment depicted in FIG. 6.

FIG. 7 illustrates a side view of a pick-up vehicle that depicts side wall 4 and swivel arms 40 and 42 without showing side wall 5 or swivel arms 41 and 43. As shown in the Figure, swivel arms 40 and 41 form a parallelogram-like structure with connection 47 at points 50 and 51 and at swivel axes 52 and 53, as discussed above with regard to FIG. 6. As with the other parts of swivel arms, connection 47 can be formed of, e.g., steel pipe having a circular, rectangular, square or other cross section. In the embodiment depicted in FIG. 7, swivel axes 52 and 53 can. be located above cargo bed 3 at various heights, as indicated by dashed line 54. However, swivel axes 52 and 53 could also lie at the same height above or below cargo bed 3, at different heights below cargo bed 3, or one above and one below cargo bed 3. In the instant embodiment, the bending of swivel arms 40 and 42 is created only by connection 47 being "bent" in relation to the swivel arms to which it is coupled. FIG. 7 shows three positions for the swivel arm arrangement: in a rest position as swivel arms 40 and 42 and connection 47; in an intermediate position as swivel arms 40' and 42' and connection 47'; and in an extended or loading position as swivel arms 40" and 42" and connection 47". Because of the parallelogram-like structure, connection 47, 47', and 47" always remains in the same position with respect to a substantially horizontal line 54 that extend through axes 52 and 53, thereby creating a bending of the swivel arms with a changeable angle α. A loading platform 25 can be, e.g., rigidly coupled via a rigid rod 59 to a location 58 on connection 47 of the swivel arm, so that loading platform 25 maintains its horizontal position during swinging and, on account of its rigid connection, cannot proceed to swing. This arrangement is advantageous as compared to the embodiment depicted in FIG. 2 in which platform was suspended because a non-moving load is easier to handle and poses less of an accident hazard. Thus, the parallelogram-like solution illustrated in FIGS. 6 and 7 represents a preferable arrangement.

The depicted swivel arms with their bending or curvature generally allow for swivel arrangements to be coupled to pick-up vehicles without impairing the road worthiness of the vehicles, since the height of the swivel arms essentially corresponds to the height of the pick-up vehicle. Moreover, additional devices such as a cable winch are not necessary. A maximum height in the rest state can thus be defined by the bending or curvature of the swivel arms. The swivel device, which can be provided at the factory as original equipment for a pick-up vehicle or as a retrofit solution with a swivel device being retrofitted onto an existing pick-up vehicle, enables a simple loading of the cargo bed of the pick-up vehicle. Thus, loading with recreational vehicles can be made particularly easier when the swivel device additionally includes a loading platform which can be driven onto in its loading position, especially when the platform is attached to a parallelogram-like structure that maintains the horizontal position of the platform during swiveling. Of course, instead of such a platform, any loads can be provided, such as large vessels or containers which can be loaded or which can contain a device.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A pick-up vehicle having an open cargo bed coupled to a passenger cab, side walls, a rear wall, and wheel wells located one of inside and outside of the cargo bed, the pick-up vehicle comprising:
   a swivel device comprising at least four swivel arms swivelably coupled to a support device at first ends; and
   a connecting bridge positioned to couple at least two of said four swivel arms at ends opposite said first ends, which forms a swivelable yoke; and
   two connection pieces for coupling the swivelable yoke to the other swivel arms at the ends opposite said first ends;
   at least one load uptake device being rigidly coupled to said two connection pieces,
   wherein said swivel arms are swivelably positionable around swivel axes between a rest position in which said swivel arms are substantially over the cargo bed and an extended position in which said arms extend out of the cargo bed in a direction of said rear wall, and
   wherein said swivel axes are located one behind the other and at different heights relative to the cargo bed.

2. The pick-up vehicle according to claim 1, wherein said support device is positioned above a plane of said cargo bed.

3. The pick-up vehicle according to claim 1, wherein said support device is positioned below a plane of said cargo bed.

4. The pick-up vehicle according to claim 1, further comprising a second connecting bridge positioned to couple said other swivel arms together at ends opposite said first ends, thereby forming a second swivelable yoke.

5. The pick-up vehicle according to claim 4, wherein at least one of said two connection pieces is arranged to couple the swivelable yoke to said second swivelable yoke at the ends opposite said first ends, and
   wherein said swivelable yoke and said second swivelable yoke are swivelably positionable between a rest position in which said swivel arms are substantially over the cargo bed and an extended position in which said swivel arms extend out of the cargo bed in a direction of said rear wall.

6. The pick-up vehicle according to claim 1, wherein at least two of said swivel arms comprise one of a curved and bent section along its length.

7. The pick-up vehicle according to claim 1, wherein at least two of said swivel arms comprise a straight section, and said connection piece comprises one of a curved and bent section.

8. The pick-up vehicle according to claim 1, wherein at least two of said swivel arms comprise a straight section along its length.

9. A pick-up vehicle having an open cargo bed coupled to a passenger cab, side walls, a rear wall, and wheel wells located one of inside and outside of the cargo bed, the pick-up vehicle comprising:
   a swivel device comprising at least four swivel arms swivelably coupled to support devices at first ends, wherein said at least four swivel arms are formed into at least two pairs swivelable around swivel axes;
   at least one connecting bridge positioned to couple at least one of said at least two pairs of swivel arms at ends opposite said first ends, which forms at least one swivelable yoke;
   at least two connections for coupling the at least one swivelable yoke to the other pair of swivel arms at the ends opposite said first ends; and
   at least one load uplifting device being rigidly coupled to said at least two connections;
   wherein said at least one swivelable yoke and said other pair of swivel arms are swivelably positionable between a rest position in which said swivel arms are substantially over the cargo bed and an extended position in which said swivel arms extend out of the cargo bed in a direction of said rear wall, and wherein said swivel axes are horizontally spaced from each and arranged at different heights relative to the cargo bed.

10. The pick-up vehicle according to claim 9, wherein said support devices are positioned above a plane of said cargo bed.

11. The pick-up vehicle according to claim 9, wherein said support devices are positioned below a plane of said cargo bed.

12. The pick-up vehicle according to claim 9, wherein said support devices are positioned at least two different heights with respect to a plane of said cargo bed.

13. The pick-up vehicle according to claim 9, wherein said at least one connecting bridge comprises at least two connecting bridges positioned to couple said at least two pairs of swivel arms at ends opposite said first ends, which forms at least two swivelable yokes; and at least two connections for coupling the two swivelable yokes together at the ends opposite said first ends, wherein said at least two swivelable yokes are swivelably positionable between a rest position in which said swivel arms are substantially over the cargo bed and an extended position in which said swivel arms extend out of the cargo bed in a direction of said rear wall.

14. The pick-up vehicle according to claim 9, wherein said at least four swivel arms comprise straight sections.

15. The pick-up vehicle according to claim 9, wherein said at least four swivel arms comprise at least one of bent and curved sections.

16. The pick-up vehicle according to claim 9, wherein at least two of said at least four swivel arms comprise a straight section, and said at least two connections comprise one of a curved and bent section.

* * * * *